A. E. MOLIN.
RESILIENT TIRE.
APPLICATION FILED MAY 12, 1916.
1,217,619.
Patented Feb. 27, 1917.
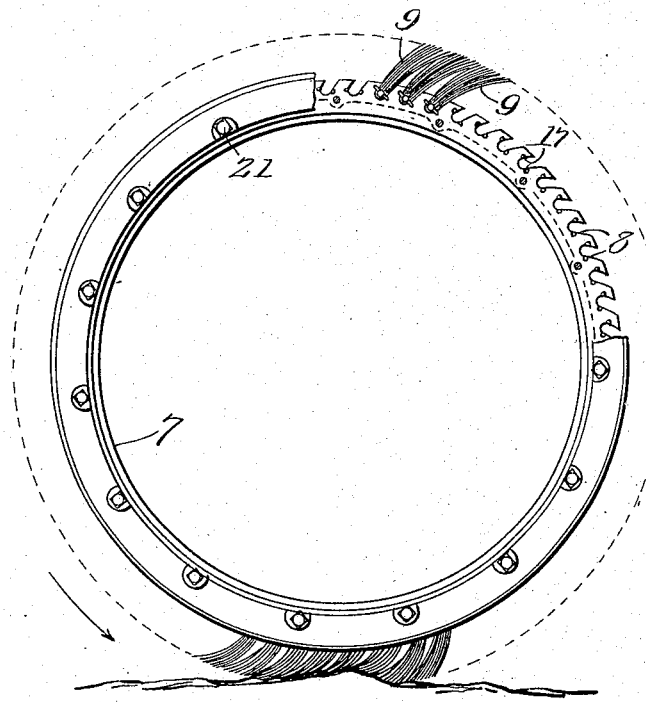
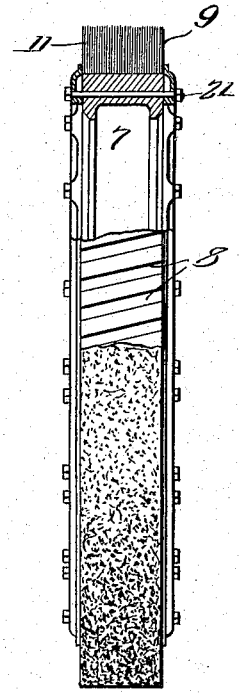
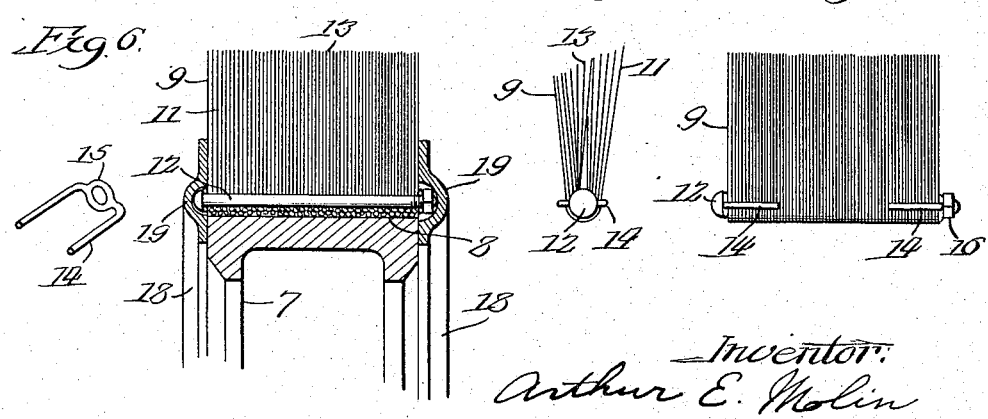
Inventor:
Arthur E. Molin
By Pond & Wilson
Attys.

UNITED STATES PATENT OFFICE.

ARTHUR EMIL MOLIN, OF ROCKFORD, ILLINOIS.

RESILIENT TIRE.

1,217,619.  Specification of Letters Patent.  Patented Feb. 27, 1917.

Application filed May 12, 1916. Serial No. 97,009.

*To all whom it may concern:*

Be it known that I, ARTHUR E. MOLIN, a citizen of the United States, residing at Rockford, in the county of Winnebago and State of Illinois, have invented certain new and useful Improvements in Resilient Tires, of which the following is a specification.

This invention relates to resilient tires of the non-pneumatic type adapted for vehicles of various kinds and especially for automobiles, in which it is desirable to provide a tire having a resilient medium that will absorb shocks caused by the tire passing over small obstructions and irregularities of ground, without danger of injuring or destroying the resiliency of the tire as is occasioned in pneumatic tires by puncture, blowouts, etc.

The primary object of my invention is to provide a resilient tire of novel construction that will obviate the well known undesirable features of pneumatic tires and will effectively serve as a shock absorbing medium to promote smooth running of a vehicle.

My invention also contemplates the provision of a resilient tire especially adapted as a drive wheel in that the tread of the wheel is of spring wire bristle like construction constituting an excellent tractive face.

To this end I have provided a tire member having a spring wire bristle like tread formed of a plurality of unitary spring wire packs secured to the tire member. These packs preferably consist of a group of closely associated wire strips bent about bolts or keepers disposed in grooves extending crosswise of the tire member so that the ends of the wires extend outwardly from the same constituting a flexible continuous brush like tread. The construction is such that promotes independent mounting and removal of the brush packs, which enables easy assemblage and permits the packs to be independently removed to repair or replace a section of the tread by a new pack or packs.

The principle and operation of my invention will be clearly understood by reference to the following description when considered in connection with the accompanying drawings in which I have illustrated one physical embodiment of the invention, and in which—

Figure 1 is a side view of a resilient tire embodying my improvements, portions of the tire being broken away to show various details;

Fig. 2 is an edge view of the tire, the upper portion of which is shown in section;

Fig. 3 is an enlarged cross-sectional view through the tire;

Figs. 4 and 5 are end and side views, respectively, of a spring wire pack; and

Fig. 6 is a perspective view of an end clamp employed in securing together the wires of a pack.

The tire member designated generally by reference character 7 may be of any suitable type, and in the present instance, I have shown a quick detachable tire member preferably formed of some light weight metal, such as aluminum. The sides and periphery of the tire member are preferably flat and in right angular relation, the periphery being formed with a plurality of circumferentially spaced sockets or grooves 8 extending crosswise of the tire member in an oblique direction as shown in Fig. 2. The grooves extend into the tire member a substantial distance in a tangential manner as shown in Fig. 1.

In each of the grooves 8 is secured a spring wire pack designated generally by reference character 9, which comprises a plurality of closely associated spring wires that collectively constitute the tread of the tire. Each pack of spring wires is a unitary resilient element adapted to be independently mounted and removed from a socket in the tire member so as to facilitate assembling the tire and to permit removal of any pack or packs from a portion of the tread that may have become worn or damaged. In Figs. 3 to 6 inclusive, the construction of a spring wire pack is shown in detail. A pack consists of a plurality of closely associated wire strips 11 bent at the middle about a bolt 12 so that their butt ends are adjacently disposed and provide a flexible tread portion 13. The wires may be suitably held in juxtaposition on the bolt as by means of U-shaped keepers or guides 14 having apertured cross heads 15 mounted on the ends of the bolt so that the arms of the keepers extend longitudinally of the bolt engaging the outer sides of a plurality of wires to hold the same against displacement from the pack. These keepers also constitute clamping members for securing the wires to the bolt, since by drawing up the nut 16 on the bolt the keepers 14 will compress the pack of wires crosswise and hold the same in very closely associated relation. From Fig. 4, it will be noted that the wires extend outwardly in closely associated relation and that the tread face 13 or butt end of the pack is obliquely cut. This is for the purpose of securing a substantially continuous and even tread when the packs are mounted on the tire member. The packs are of such thickness as to fit snugly in the sockets, as shown in Fig. 1, in which it will be seen that the divergence of the wires provide for the continuous tread. The width of the packs are equal to that of the tire member and the ends of the bolts project beyond the sides of said member, as shown in Fig. 3. The arms 14 of the keepers fit in longitudinal grooves 17 adjacent to the base of the sockets so as to prevent withdrawal of the packs from the sockets before the packs have been secured to the tire member by the fastening means.

The means for fastening or securing the packs to the tire member consists of side rings 18 fitting against the sides of the tire member and provided intermediate their edges with annular beads or grooves 19 adapted to receive the projecting ends of the bolts. Bolts 21 passing through the rings 18 and tire member 7 provide means by which the rings may be fixedly secured to said member. It will be obvious that by so attaching the rings, the spring wire packs are locked in position on the tire member.

From the foregoing, it will be manifest that the tread of the tire is of flexible bristle like construction comprising a plurality of independent spring wire packs. These, due to their tangential arrangement, strike the ground, as shown in Fig. 1, in an inclined position so as to readily flex and spring in one direction should an obstruction be encountered. The transversely oblique arrangement of the packs is designed to further guard against skidding of the tire, although it will be apparent that, due to the bristle like construction of the tread, there will be practically no tendency for the tire to skid or slip. For this reason, the tire is particularly adapted as a drive wheel. It will also be apparent that should any of the packs be damaged they may be replaced by new ones without deranging any of the remaining packs, it being obvious that in removing any of the packs, the rings 18 must be first removed.

While I have shown and described a single physical embodiment of my invention, it should be understood that the same is capable of being modified and details of construction changed and altered within the spirit and scope of the invention as expressed in the appended claims.

I claim:

1. A resilient tire comprising a tire member having a plurality of spaced grooves in its periphery extending crosswise of the same, a bolt disposed lengthwise in each groove and projecting beyond the ends thereof, a plurality of closely associated wire strips turned beneath said bolts in the grooves and extending outwardly therefrom forming the tread of the tire, side rings shaped to coöperate with the said projecting ends of the bolts to hold the same and the wire strips in connection with the tire member, and means for securing the said rings to the tire member.

2. A resilient tire comprising a tire member having on its periphery a plurality of spaced grooves extending crosswise and obliquely of the same, a bolt disposed in each groove, a plurality of U-shaped wire strips secured beneath each bolt and extending outwardly therefrom so as to collectively form a wire brush like tread, and rings at each side of the tire member coöperating with the ends of the bolts to hold the same against radial displacement and thereby secure the wire strips in connection with the tire member.

3. A resilient tire comprising a tire member, the periphery of which is formed with a plurality of relatively closely arranged transverse grooves, a plurality of U-shaped wire strips positioned side by side in each groove with their bent portions within the grooves and their arms extending outwardly forming a brush like tread, and a member engaged between the arms and against the bends of the wire strips in each groove and secured to the tire member for holding the wire strips against outward displacement from the grooves.

4. A resilient tire comprising a tire member, the periphery of which is formed with a plurality of relatively closely arranged transverse and obliquely extending grooves, and spring wire strips closely packed in each groove and extending outwardly therefrom in a tangential direction so as to collectively form a continuous brush like tread.

5. A resilient tire comprising a tire member provided on its periphery with a plurality of transverse grooves, a plurality of unitary brush like packs of spring wire strips, and means for detachably securing a pack in each groove, the packs being shaped to collectively form a continuous flexible tread and being independently removable from the tire member.

ARTHUR EMIL MOLIN.

Copies of this patent may be obtained for five cents each, by addressing the "Commissioner of Patents, Washington, D. C."